United States Patent [19]

Stabs

[11] Patent Number: 5,038,493
[45] Date of Patent: Aug. 13, 1991

[54] ELEVATION AND PLUMB POSITION DETERMINING DEVICE

[76] Inventor: Bruce A. Stabs, c/o Western Mechanical P.O. Box 60067 Airport Annex, Fairbanks, Ak. 99706

[21] Appl. No.: 249,384
[22] Filed: Sep. 26, 1988
[51] Int. Cl.$^5$ .............................................. G01B 3/08
[52] U.S. Cl. .................................................... 33/809
[58] Field of Search .................. 33/161, 169 R, 462, 33/809, 832, 295, 296, 520

[56] References Cited

U.S. PATENT DOCUMENTS

| | | | |
|---|---|---|---|
| 994,741 | 6/1911 | Gorenflo | 33/462 |
| 1,781,634 | 11/1930 | Fenk | 33/529 X |
| 2,245,646 | 6/1941 | Bullivant | 33/809 |
| 3,992,737 | 2/1970 | Swanson | 33/809 |

FOREIGN PATENT DOCUMENTS 254564 12/1912 Fed. Rep. of Germany ........ 33/809

*Primary Examiner*—Harry N. Haroian
*Attorney, Agent, or Firm*—Sten Erik Hakanson

[57] ABSTRACT

The present invention comprises a measuring/positioning device. The invention herein is particularly designed for determining the elevation above a reference floor surface of an overhead object, such as pipe, conduit, duct work, structural steel and the like, the elevation of the center line of tubular objects, and the plumb position on the reference floor surface above which the center line of a tubular object lies. The present invention includes a sensing head that is pivotally secured to one end of an elongate measuring rod. The measuring rod has a measuring scale thereon and is slideably and telescopically engaged within a rigid elongate rectangular housing. The housing includes means for releasable securing the measuring rod at various positions there along, and includes read out points positioned thereon. A pair of level indicators are secured to the housing so that the measuring rod and housing can be positioned to extend through a true vertical line. The read out points are positioned along the housing and the measuring scale is arranged so that the readout means, the measuring scale and the sensing head cooperate to provide measurements of the distance relationship between the object and the reference surface when the object is in contact with the sensing head.

4 Claims, 1 Drawing Sheet

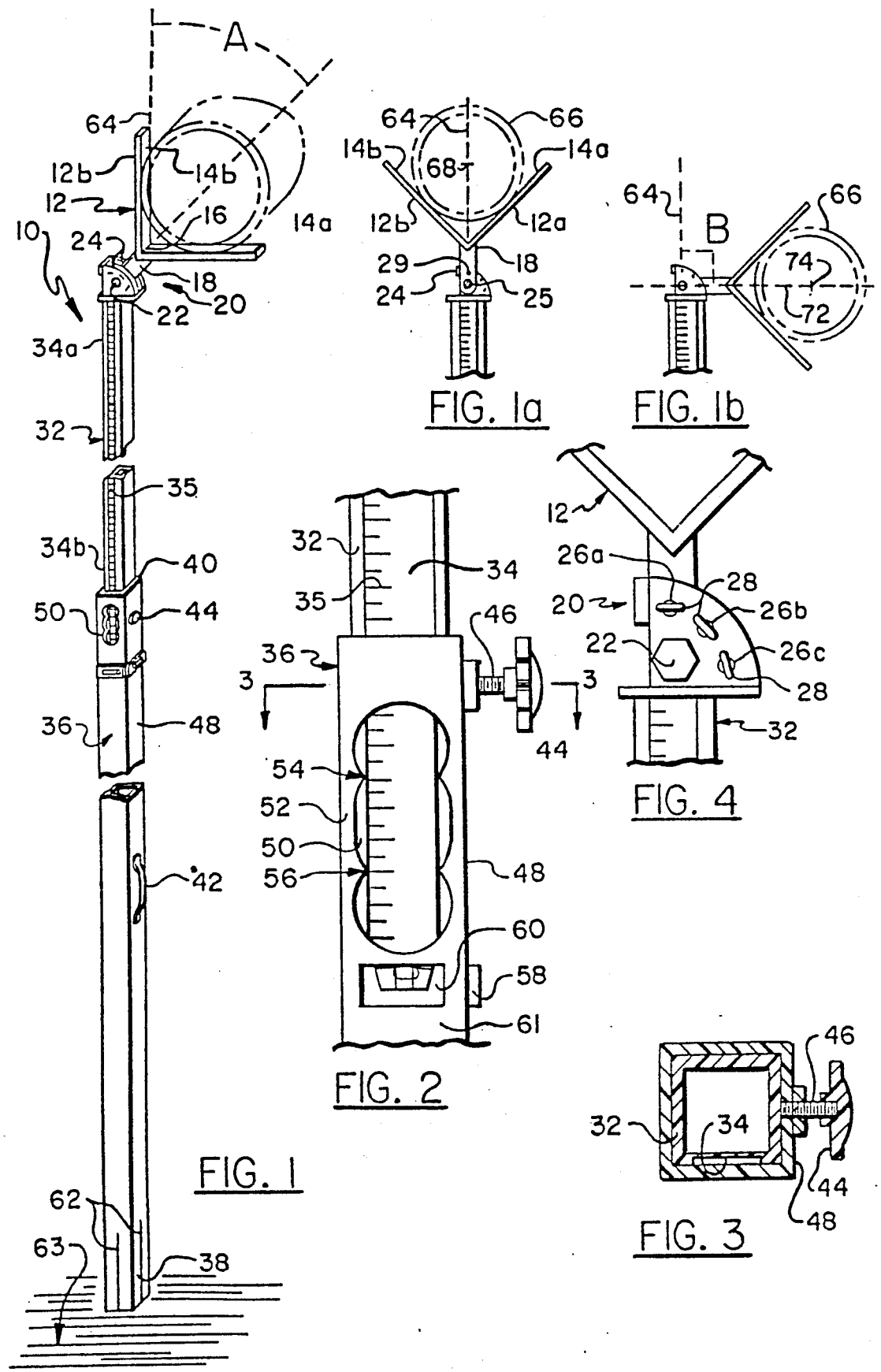

ELEVATION AND PLUMB POSITION DETERMINING DEVICE

BACKGROUND OF THE INVENTION

1. Field of the Invention

The present invention relates generally to measuring devices, and more specifically to measuring devices used for determining exact elevations and locations of piping systems and the like.

2. Background

In the construction and repair industries it is often necessary when working with piping systems, conduits, duct work structural steel, and the like, to be able to ascertain the precise position thereof, especially with respect to a reference surface. In particular, it is frequently important to establish with tubular objects, such as pipes, the distance of the center point thereof from a reference surface, and the plumb position thereof with respect to a reference surface. It is also important to be able to establish the various elevations of tubular and non-tubular objects above a reference surface, so that, for example, repair or construction can proceed around them.

Various shaft and pipe aligning devices have been proposed in the prior art, such as seen in U.S. Pat. Nos. 600,049 to Thompson, 868,074 to Clark, and 1,781,634 to Fenk. However, these patents do not provide for measuring to a reference surface and are concerned with tubular objects. Thus, repair or construction personnel are required to rely upon a collection of conventional equipment or tools such as step-ladders, levels, measuring tapes and plumb-bobs to determine the majority of any needed elevation and position measurements. This approach is inefficient and time consuming, and therefore costly. In addition, such an approach can be prone to inaccuracy. It would therefore be very desirable to be able to establish such elevation and position measurements quickly and accurately, and with the minimum of equipment.

SUMMARY OF THE INVENTION

The objects and advantages of the present invention, include, but are not limited to, the following:

1. To provide for a single device that can establish elevation and position measurements for a wide variety of objects.

2. To provide for such a device that can specifically determine elevation and position measurements for tubular objects.

3. To provide for such a device can establish the plump position on a reference surface which lies directly below the center line of an overhanging tubular object.

4. To provide for such a device that is mechanically simple and inexpensive to manufacture, and is accurate and easy to use.

The measuring/positioning device of the present invention includes a V-shaped sensing head having a pair of contact arms. The contact arms are integral with each other at common ends thereof and extend outwardly at right angles to each other forming the V-shape. The apex of the V-shaped sensing head is integral with one end of a short sensing head flange, and the opposite end of the flange is pivotally secured to an adjustment mechanism. The adjustment mechanism is secured to one end of an elongate rigid measuring rod, and includes adjustment stops for setting the flange to 0, 45 and 90 degree angles with respect to the measuring rod. The measuring rod has a measuring scale thereon in which the units of measure are arranged in ascending order from the sensing head end to its other end.

The measuring rod is slideable engaged within an elongate rectangular housing. The housing has a base or foot end, and an open end opposite thereto through which the measuring rod slides in a telescopic relationship with the housing. The housing also includes an opening or measuring window through one of the sides thereof through which the measuring scale can be viewed. The window includes first and second measuring points displaced in a linear direction from each other along the measuring scale, with the second point extending from the first in a direction towards the foot of the housing. An adjustment knob is threadably engaged with the housing for releasably securing the measuring rod therein. A pair of level indicators are attached to adjacent exterior surfaces of the housing, and each extend in a direction perpendicular to the extension of the measuring rod and the housing.

With the sensing head flange set at an angle of 90 degrees with respect to the measuring rod, it can be appreciated that the contact arms of the sensing head will each extend at an angle of 45 degrees to the measuring rod. In this position the elevation of the center point of a tubular object above a reference floor surface can be measured. Specifically, the foot of the housing rests upon the floor and the adjustment knob is loosened so that the measuring rod can slide freely. The sensing head is then positioned so that the overhead object, such as a pipe, is positioned within the V-shape thereof so that the contact arms are both touching the pipe. The round pipe will then be centered between the contact arms, after which the level indicators are consulted to insure that the housing and measuring rod extend along a true vertical line. The housing knob is then tightened fixing the position of the measuring rod within the housing. The first measuring point and the scale on the measuring rod are positioned so that the reading at the first point equals the height of the apex of the sensing head form the floor. It can be understood that this height corresponds precisely to the elevation of the mid-point of the pipe from the floor.

With the sensing head flange set at an angle of 45 degrees with respect to the measuring rod, it can be appreciated that one arm of the sensing head will extend at an angle of 90 degrees to the measuring rod, and the other will extend in a direction parallel with that of the measuring rod. In this position the elevation of an object above a reference floor surface can be measured. Specifically, the foot of the housing rests upon the floor and the adjustment know is loosened so that the measuring rod can slide freely. The sensing head is then positioned so that the bottom most surface of an overhead object is touching the upper surface of the contact arm that is extending outwardly at a 90 degree angle from the measuring rod. As above, the level indicators are used to insure that the measuring rod and housing extend along a true vertical line, after which the housing knob is tightened, fixing the position of the measuring rod within the housing. The second measuring point and the scale on the measuring rod are positioned and arranged so that the reading at the second point equals the height of the upper surface of the perpendicularly extending contact arm. It can be understood that this height corresponds precisely to the elevation of the bottom point of the overhead object from the floor.

With the sensing head flange set at an angle of 0 degrees with respect to the measuring rod, it can be appreciated that the arms of the sensing head will each extend at an angle of 45 degrees to the measuring rod on opposite sides thereof. In this position the plumb position on a reference floor surface beneath the center line of a tubular object can be located. Specifically, the foot of the housing rests upon the floor and the adjustment knob is loosened so that the measuring rod can slide freely. The sensing head is then positioned so that the overhead object such as a pipe is positioned within the V-shape thereof so that the contact arms are both touching the pipe. The round pipe will then be centered between the contact arms, after which the level indicators are consulted to insure that the housing and measuring rod extend along a true vertical line. The housing knob is then tightened fixing the position of the measuring rod within the housing. It can be understood that the foot of the housing will indicate the point on the floor that is directly below the center line of the overhead pipe.

BRIEF DESCRIPTION OF THE DRAWINGS

Further objects and advantages of the present invention will be understood in light of the following detailed description which refers to the following drawing, wherein:

FIG. 1 is a perspective view of the present invention, and showing the sensing head in position for establishing the elevation above a reference surface of an object.

FIG 1a is a cutaway view of the sensing head and adjustment mechanism of the present invention in position for establishing the plumb position on a reference surface of a tubular object there above.

FIG. 1b is a view of the sensing head and adjustment mechanism of the present invention showing the sensing head in position for establishing the elevation of the center line of a tubular object above a reference surface.

FIG. 2 is an enlarged view of the central portion of the present invention.

FIG. 3 is a cross-sectional view along line 3—3 of FIG. 2.

FIG. 4 is an enlarged view of the adjustment mechanism and sensing head of the present invention.

DETAILED DESCRIPTION OF THE PREFERRED EMBODIMENT

The measuring/positioning tool of the present invention is referred to in the various figures by the numeral 10. As seen in the various figures, measuring device 10 includes a V-shaped sensing head 12 having two arms 12a and 12b. Arms 12a and 12b include contact surfaces 14a and 14b, and extend from a common apex 16 at right angles to each other. Head 12 is integral with one end of a flange 18 and extends symmetrically therefrom. The opposite end of flange 18 is pivotally mounted to an adjustment head 20 by a pin 22 that extends through holes (not shown) in a pair of parallel spaced pie shaped adjustment head extensions 24 and through a hole 25, seen in FIG. 1a, in flange 18. As seen in FIG. 4, extensions 24 include threaded holes 26a, 26b and 26c at three positions thereon through which a thumb screw 28 can be releasably engaged. Flange 18 includes a hole 29 located approximately in the middle thereof through which screw 28 can extend.

Adjustment head 20 is secured to one end of a measuring rod 32 so that the axis of pin 22 is centered with respect to rod 32. Measuring rod 32 is rectangular in shape and includes a recessed surface 34. Surface 34 includes a measuring scale 35 thereon which units of measurement thereof are arranged in ascending order from the adjustment head end 34a towards the opposite end 34b thereof. Rod 32 is slideably engaged within a rectangular housing 36. Housing 36 includes a closed foot end 38, and open end 40 for receiving rod 32, and a carrying handle 42. An adjustment knob 44 is threadably engaged with housing 36 by a bolt 46 extending through a wall 48 of housing 36. A scale viewing window 50 extends through housing wall 52, and includes two measurement points 54 and 56. A pair of bubble-type level indicators 58 and 60 are affixed to housing walls 48 and 61 respectively. Indicators 58 and 60 extend in directions transverse to the extension of housing 36 and measuring rod 32, and are positioned at right angles to the line of extension of the other. A pair of center line marks 62 extend along the length and center of housing walls 48 and 61 at foot end 38.

Referring to FIG. 1a, it can be appreciated that the present invention can be utilized to establish the plumb position on a reference surface 63 of a pipe or other tubular object suspended there above. Specifically, pin 28 extends through holes 26a and 29 whereby flange 18 extends along a center line of extension 64 thereof, which line 64 extends through apex 16 bisecting the V-shape defined by arms 12a and 12b. Measuring rod is positioned so that a pipe 66 is nestled between contact arms 12a and 12b. Housing 36 is extended so that foot end 38 thereof contacts reference surface 63, after which know 44 is rotated so that bolt 46 is tightened upon rod 32 and fixes the position thereof within housing 36. Levels 58 and 60 are then consulted to insure that rod 32 and housing 36 extend along a true vertical line. It can be understood that the present invention will then stand freely or unattended supported by foot end 38 and contact arms touching pipe 66. It can now be appreciated that the center point 68 of pipe 66 will be aligned with center line 64, whereby foot end 38 will be positioned over the plumb point on reference surface 63 directly below the center point 68 of tube 66. Then, for example a separate tape measure can be used to measure the distance of a wall to the plumb point on surface 63 corresponding the center point 68 by extending the tape from the wall to the appropriate center line mark 62.

Referring to FIG. 1, the present invention can be utilized to determine the elevation of a particular object above reference surface 63. Specifically, pin 28 is first inserted through holes 26b and 29, whereby flange 18 extends at an angle A of 45 degrees to the line of extension 64 or rod 32. In this position it can be seen that contact arm 12a extends at a right angle to rod 32. Measuring rod 32 is positioned so that surface 14a of rod 32 is in contact with the bottom most point of pipe 66, the elevation of which is to be measured. Housing 36 is then extended so that foot end 38 thereof contacts reference surface 63, after which knob 44 is rotated so that bolt 46 is tightened upon rod 32 and fixes the position thereof within housing 36. Thus, housing 36 serves as a support means for rod 32. Levels 58 and 60 are then consulted to insure that rod 32 and housing 36 extend along a true vertical line. Measurement point 56 and the measuring scale 35 on rod 32 are positioned and arranged so that the measurement on scale 35 that is indicated at point 56 is equal to the height of surface 14a above the reference surface 63.

Referring to FIG. 1b, the present invention can be utilized to determine the elevation of the center line of a tubular object above a reference surface 63. Specifically, pin 28 is first inserted through holes 26c and 29, whereby flange 18 extends along a line 72 at an angle B of 90 degrees to the line of extension 64 of rod 32. In this position it can be seen that contact arms 12a and 12b extend at 45 degree angles to line 64 and to rod 32 and housing 36. Measuring rod 32 is then positioned so that pipe 66 is nestled between arms 12a and 12b and contacting surfaces 14a and 14b thereof. Housing 36 is then extended so that foot end 38 thereof contacts reference surface 63, after which knob 44 is rotated so that bolt 46 is tightened upon rod 32 and fixes the position thereof within housing 36. Levels 58 and 60 are then consulted to insure that rod 32 and housing 36 extend along a true vertical line. Measurement point 58 and the measuring scale 35 on rod 32 are positioned and arranged so that the measurement on scale 35 that is indicated at point 58 is equal to the height of line 72 above reference surface 63, which line extends at a right angle to rod 32 and through apex 16. It can be appreciated that this height of line 72 is equal to the elevation of the center point 74 of pipe 66 above reference surface 63.

It can now be appreciated that the present invention provides for quickly and easily establishing the elevation above a reference surface of a variety of objects, such as pipes, conduits, air ducts and the like, and the elevation of the center line of tubular objects above a reference surface. It can also be appreciated that the invention herein can quickly and easily establish the plumb point on a reference floor surface of an overhead tubular object. It can also be seen that the elevation/positioning device of the present invention can provide for measurement of horizontal distances between objects, or between an object and a vertical reference surface.

It will be apparent to those of skill in the art that various alterations or modifications can be made to the present invention without exceeding the spirit or scope of the essential attributes thereof. For example various adjustment means could be used to provide for an adjustment head capable of infinite settings, that is, for positioning sensing head 12 at a plurality of angles with respect to the extension of rod 32 in addition to the 0, 45 and 90 degree positions. Therefore, it is desired that the present embodiment be considered in all respects as illustrative and not restrictive, reference being made to the appended claims rather than to the foregoing description to indicate the scope of the invention.

What is claimed is:

1. A measuring/positioning device for determining elevations and plumb locations of various objects including pipes, conduits, duct work, and the like, with respect to a reference surface, comprising: a sensing head for contact the object, the sensing head having a pair of contact arms joined at common ends thereof forming an apex point and extending therefrom forming a V-shape, an elongate measuring rod having a first end and a second end opposite to the first end and having a measuring scale thereon extending along the length thereof in ascending order from the first end to the second end, an adjustment head secured to the first end of the measuring rod and having a flange including a first end pivotally secured to the adjustment head and a second end secured to the apex point of the sensing head, and the adjustment head including adjustment means releasably cooperating with the flange for releasably fixing the sensing head in a plurality of angular relationships with respect to the line of extension of the measuring rod, support means slideably engageable with the measuring rod and releasably securable therewith for supporting the measuring rod with respect to the reference surface and the support means including indicating means for indicating a measuring point along the measuring scale, and level determining means secured to the support means to provide for orienting the measuring rod along a true vertical line, the indicating means positioned along the support means and the measuring scale positioned on the measuring rod so that the indicating means, the measuring scale and the sensing head cooperate to provide measurements of the distance relationship between the object and the reference surface when the object is in contact with the sensing head.

2. The measuring/positioning device as defined in claim 1, and the contact arms extending at right angles to each other.

3. The device as defined in claim 1, and the level indicating means including a pair of levels oriented at a right angle to each other and both extending in a place perpendicular to the extension of the measuring rod.

4. The device as defined in claim 1, and the adjusting means providing for releasable locking of the sensing head in angles of 0, 45 and 90 degrees with respect to the extension of the measuring rod.

* * * * *